United States Patent [19]
Oaks

[11] Patent Number: 5,394,728
[45] Date of Patent: Mar. 7, 1995

[54] METHOD FOR FORMING A U-BOLT CLAMP SADDLE

[76] Inventor: Daniel V. Oaks, 2734 Ronald, Troy, Mich. 48098

[21] Appl. No.: 147,974

[22] Filed: Nov. 4, 1993

[51] Int. Cl.6 .............................................. B21D 53/36
[52] U.S. Cl. ..................................... 72/379.2; 24/277
[58] Field of Search ............. 24/277; 72/48, 51, 379.2

[56] References Cited

U.S. PATENT DOCUMENTS

| | | |
|---|---|---|
| 2,993,255 | 7/1961 | Jagiel . |
| 3,055,072 | 5/1962 | Brown . |
| 3,137,053 | 6/1964 | Osborn et al. . |
| 3,192,593 | 7/1965 | Osborn et al. . |
| 3,605,214 | 9/1971 | Spotts et al. . |
| 3,772,745 | 11/1973 | Dowling et al. . |
| 3,879,815 | 4/1975 | Dowling et al. . |
| 3,955,250 | 5/1976 | Heckethorn . |
| 4,040,152 | 8/1977 | Gilgallon . |
| 4,063,336 | 12/1977 | Jones et al. . |
| 4,122,586 | 10/1978 | Northdurft . |
| 4,141,577 | 2/1979 | Beebe . |
| 4,183,122 | 1/1980 | Wagner . |
| 4,229,863 | 10/1980 | Bowden et al. . |
| 4,265,005 | 5/1981 | Heckethorn . |
| 4,393,559 | 7/1983 | Heckethorn et al. . |
| 4,479,288 | 10/1984 | Jones . |
| 4,488,334 | 12/1984 | Goforth . |

*Primary Examiner*—Lowell A. Larson
*Attorney, Agent, or Firm*—Remy J. VanOphem; John VanOphem

[57] ABSTRACT

A method for forming a saddle for a U-bolt clamp assembly which is suitable for clamping together the components of an automotive exhaust system. The method is capable of forming a saddle which exhibits sufficient strength and rigidity in order to generate a clamping load which can reliably join the exhaust components, while also being sufficiently resilient to accommodate variations in pipe size and hardness so as to reliably seal the joint formed by the components. The method of this invention produces a saddle structure which is relatively uncomplicated, and can be manufactured from a one-piece blank utilizing a series of conventional forming operations that offer a relatively low cost manufacturing process suitable for use in mass production.

20 Claims, 7 Drawing Sheets

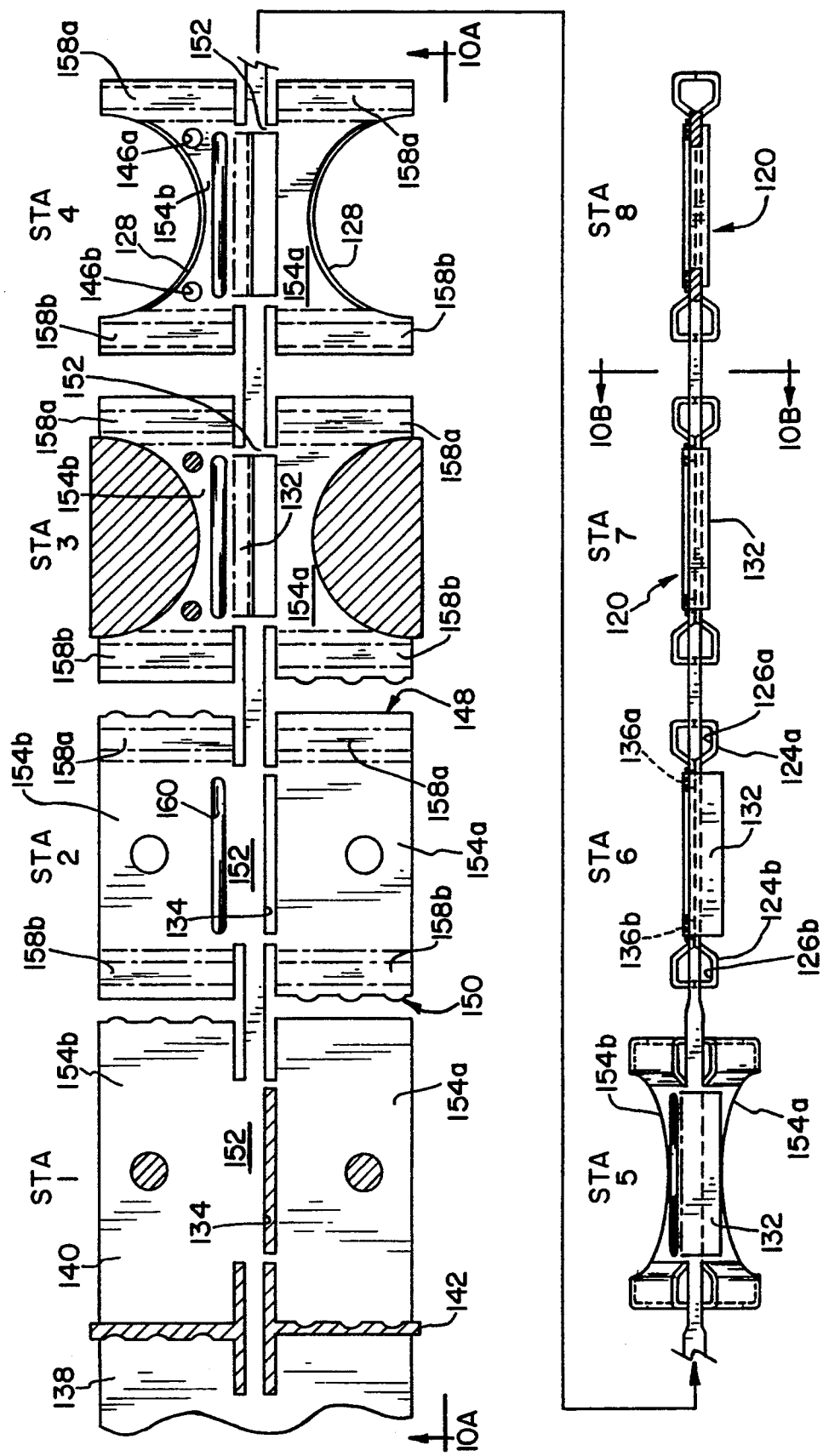

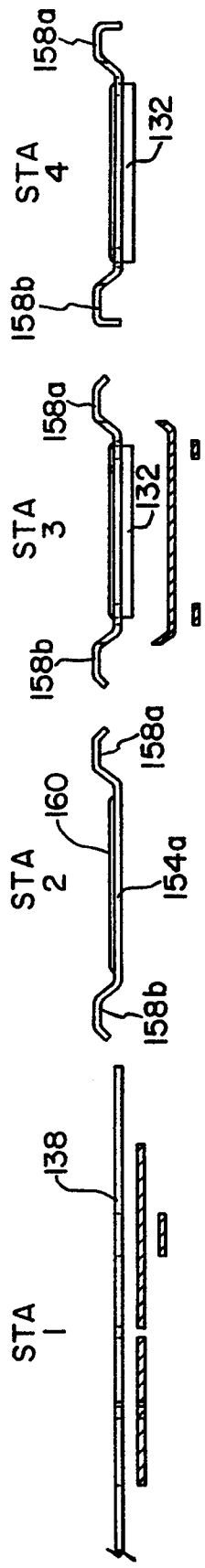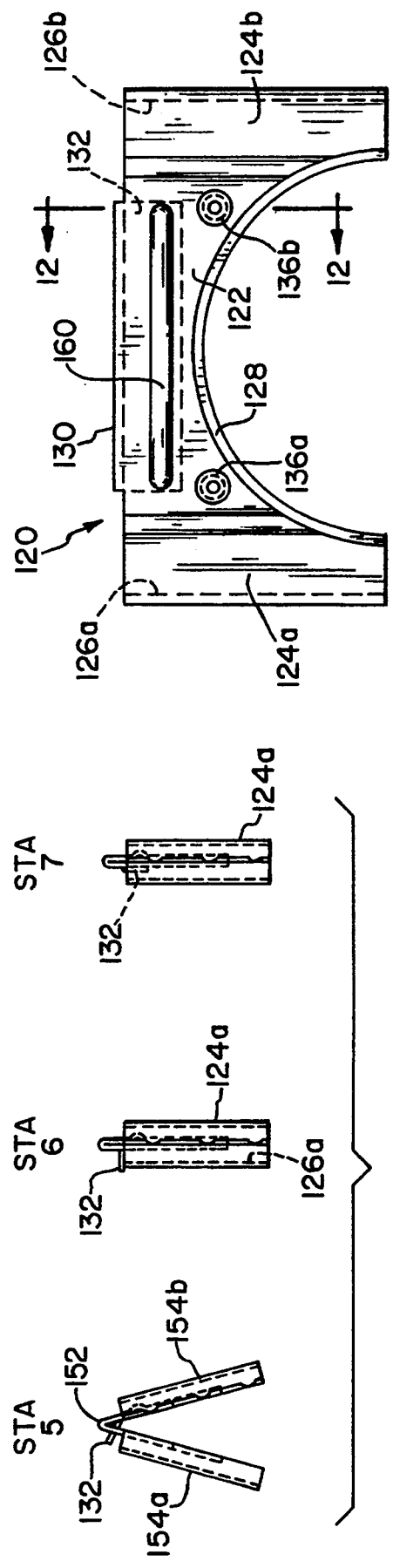

ically and functional advantages over other saddle designs known in the prior art. However, the two-piece

METHOD FOR FORMING A U-BOLT CLAMP SADDLE

BACKGROUND OF THE INVENTION

1. FIELD OF THE INVENTION

The present invention generally relates to clamps used to interconnect pipe sections of an automotive exhaust system. More specifically, this invention relates to a method for forming a clamp saddle for a U-bolt clamp, wherein the method provides a relatively low cost manufacturing process which is suitable for use in mass production, and the clamp saddle produced thereby is structurally strong yet sufficiently resilient so as to be able to accommodate variations in pipe size and hardness.

2. DESCRIPTION OF THE PRIOR ART

Automotive exhaust systems are conventionally composed of several pipe sections which interconnect the engine's exhaust manifold with one or more mufflers. While original equipment and aftermarket exhaust systems may be of a unitary design in which the system's components are welded together, it is not uncommon that the individual components of an exhaust system are held together by telescoping one pipe section within its mating pipe section, and then securing the components together with a clamp.

Various forms of clamps have been especially developed for the purpose of clamping exhaust components together. A common example is the U-bolt clamp, which is generally composed of a U-shaped bolt and a U-shaped saddle. The ends of the U-shaped bolt are threaded and, when inserted through a pair of holes or channels formed in the saddle, the U-bolt and saddle together form a circular passage through which a pipe section can be received. The effective diameter of the circular passage is altered by the degree to which the threaded ends of the U-bolt project through the channels in the saddle. Tightening a nut on each threaded end of the U-bolt enables the U-bolt clamp to generate a clamping load on the pipe sections received in the circular passage. In doing so, a pair of nested pipe sections can be sufficiently collapsed around each other so as to secure the pipe sections together and form a seal between the pipe sections which is sufficient to substantially prevent the escape of exhaust gas.

U-bolt clamps must be capable of generating a significant clamping load in order to reliably secure two exhaust components through numerous thermal cycles while exposed to a corrosive environment. Consequently, the design of a U-bolt clamp, and particularly the U-bolt saddle, must be structurally strong, yet must be sufficiently resilient in order to be able to accommodate variations in pipe size and hardness. Accommodating some deviation in pipe size is essential in order for the U-bolt clamp to reliably seal the joint formed by the pipe sections being clamped. In addition, the accommodation of such variations avoids the requirement for a uniquely sized U-bolt clamp for every exhaust system manufactured as original or aftermarket equipment.

Due to the relatively complicated structural requirements of the saddle, a further reduction in the manufacturing costs of a U-bolt clamp design necessitates a relatively low cost manufacturing process for the saddle which is suitable for use in mass production. Achieving a suitable compromise between strength, adaptiveness and cost is a continuing challenge for manufacturers of these devices. Accordingly, many variations of U-bolt clamps have been suggested in the prior art. One such variation involves forming the saddle from two members which are permanently fastened together to form a unitary saddle. Examples of this approach are illustrated in U.S. Pat. No. 2,719,345 to Riker, U.S. Pat. No. 3,055,072 to Brown, U.S. Pat. No. 4,040,152 to Gilgallon, and U.S. Pat. No. 4,488,334 to Goforth. Each of these approaches teach welding the half members together to form the desired unitary saddle structure. Notably, the teachings of Goforth are directed toward a rigid saddle structure which exhibits a slight degree of yieldability in order to provide a reliable connection between pipe sections even when variations in pipe size and shape exist. Goforth contrasts saddle structures of the type taught by Gilgallon, characterizing them as being excessively rigid, such that variations in the size and shape of pipe sections cannot be readily conformed to during clamping. Goforth teaches that excessive rigidity results in reduced radial deflection and a less reliable sealing of the joint formed by the pipe sections.

The clamping capability achieved by the U-bolt clamp taught by Goforth achieves a desirable balance of the strength and adaptiveness requirements noted above. However, the manufacturing and assembly of two individual members to form the saddle can be disadvantageous from the standpoint of processing costs and complexity, in that two individual components must be formed, accurately positioned relative to each other, and then welded together in order to form the desired unitary saddle structure.

Accordingly, the prior art also includes suggestions which advocate the formation of the saddle from a unitary stamped piece. Examples of this approach are illustrated in U.S. Pat. No. 3,192,593 to Osborn et al., U.S. Pat. No. 3,772,745 to Dowling et al., U.S. Pat. No. 4,122,586 to Nothdurft, U.S. Pat. No. 4,229,863 to Bowden et al., and U.S. Pat. No. 4,265,005 to Heckethorn. Each of these approaches teach forming the saddle from a metal blank which is folded over on itself to form mating halves of a unitary saddle structure. Osborn et al. illustrate such an approach in its more basic form, in which the mating halves are secured in a face-to-face relationship. Dowling et al. teach the addition of a flange in order to reinforce the saddle and prevent its buckling during tightening of the U-bolt nuts. Similarly, Nothdurft teaches the forming of reinforcing ribs in the saddle to resist bending of the saddle. Heckethorn teaches the combination of a reinforcing rib and flange in order to stiffen the saddle. Finally, Bowden et al. teach that forming the saddle to have a U-shaped cross section, as opposed to the face-to-face configuration taught by Osborn et al., Dowling et al., Nothdurft, and Heckethorn, enhances the strength of the saddle.

However, as taught by Bowden et al., saddles such as that taught by Osborn et al. and Dowling et al. are not sufficiently rigid to adequately secure exhaust pipe sections together. At the other extreme, Goforth notes that saddles such as that taught by Nothdurft are excessively rigid to suitably accommodate variations in size and shape of the pipe sections. Goforth also notes that excessive size of the saddle is undesirable from the standpoint of installation. Such appears to be the case with Nothdurft and Bowden et al.

From the above discussion, it can be readily appreciated that the saddle structure taught by Goforth has structural and functional advantages over other saddle designs known in the prior art. However, the two-piece design taught by Goforth can be disadvantageous from the standpoint of processing costs and complexity.

Accordingly, what is needed is a cost-efficient U-bolt clamp for clamping two pipe sections of an automotive exhaust system together, wherein the U-bolt clamp is structurally strong, yet exhibits sufficient resiliency so as to be able to accommodate variations in pipe size and hardness, while simultaneously requiring a relatively uncomplicated forming operation to achieve the desired results.

SUMMARY OF THE INVENTION

According to the present invention there is provided a method for forming a saddle for a U-bolt clamp which is suitable for clamping together the components of an automotive exhaust system. The method is capable of forming a saddle which exhibits sufficient strength and rigidity in order to generate a clamping load sufficient to reliably secure the exhaust components through numerous thermal cycles. Simultaneously, the saddle formed in accordance with the present invention is sufficiently resilient to accommodate variations in pipe size and hardness, so as to reliably seal the joint formed by the components being joined. The method of this invention produces a saddle structure which is relatively uncomplicated, and can be manufactured utilizing a series of conventional forming operations which offer a relatively low cost manufacturing process that is suitable for use in mass production. Accordingly, the method of this invention advantageously achieves a desirable balance of strength, adaptiveness and cost.

As is generally conventional, the saddle formed in accordance with the teachings of this invention is intended to be used with a U-bolt to form a U-bolt clamp. The U-bolt generally has a U-shape in which a pair of legs extend substantially parallel to each other, each terminating in a threaded portion. The saddle of this invention generally includes a pair of channels which are interconnected by a web. The web has a semicircular cutout which approximately corresponds in size to the radius of an exhaust pipe which is to be clamped with the saddle. The structure of the saddle is advantageously similar to that taught by U.S. Pat. No. 4,488,334 to Goforth, as discussed above. In particular, the web is composed of two sheets of metal which are secured face-to-face by a clinching operation, as opposed to welding as is conventionally practiced in the prior art. A tab is wrapped around an outer edge of the web to contribute an added degree of rigidity to the saddle.

Two alternative forming approaches may be utilized in the method of this invention. Each of the approaches includes a forming operation, preferably a blanking operation, by which a substantially planar blank is formed. The planar blank includes a first end portion, an oppositely disposed second end portion, and an intermediate portion between the first and second end portions. The first and second end portions terminate in first and second distal edges, respectively. The intermediate portion defines first and second lateral edges of the planar blank, and has the tab formed therewith. The first and second end portions are then bent towards each other such that the first distal edge of the first end portion is proximate the second distal edge of the second end portion. Finally, the tab is bent so as to overlay at least a portion of the first and second end portions.

In a first embodiment, the first lateral edge of the intermediate portion has a semicircular cutout so as to define a semicircular contour, the tab projects from the second lateral edge of the intermediate portion, and the first and second end portions have arcuate contours such that they cooperate to define a second substantially semicircular contour when their distal edges are proximate each other. With this configuration, the first and second end portions are folded over the intermediate portion, such that their distal ends meet roughly at the center of the intermediate portion, and are then clinched to the intermediate portion. This bending operation forms a pair of oppositely disposed channels in regions of the planar blank intermediate the first end portion and intermediate portion, and intermediate the second end portion and intermediate portion, respectively. The tab is then bent over the distal ends of the end portions to contribute added rigidity to the outer edge of the intermediate portion.

In the second embodiment, the distal ends of the end portions each have semicircular contours, and the tab is defined by an interior portion of the intermediate portion. In accordance with this embodiment, halves of the channels are formed at the lateral edges of each end portion, such that bending the first and second end portions towards each other mates the halves of the channels to form the desired channels on opposite ends of the saddle. Furthermore, the tab is bent over one of the end portions to provide additional rigidity to the saddle.

According to a preferred aspect of this invention, both of the above forming methods are relatively uncomplicated. Each begins with a blanking operation from which a single planar blank is formed, such that the requirement to separately form, mate and join two separate members is eliminated. Each method also includes further forming operations in which the channels are formed and the tab is wrapped around an outer edge of the saddle in order to provide reinforcement to the saddle without contributing excessive rigidity. Each also includes a clinching operation by which the end portions of the planar blank are permanently and reliably secured to either the intermediate portion or to each other. The elimination of a welding operation is desirable from a processing standpoint, in that it eliminates the requirement to have welding equipment stationed at the assembly line. Consequently, the methods of this invention require minimal additional manufacturing equipment on the assembly line, other than the tooling necessary to perform the blanking, forming and clinching operations.

In addition, a significant advantage of the present invention is that the saddle formed by the processing methods of this invention exhibits sufficient structural strength so as to be capable of generating a significant clamping load in order to reliably secure together the components of an automotive exhaust system. Yet, the saddle also exhibits sufficient resiliency in order to be able to accommodate variations in pipe size and hardness, so as to be able to reliably seal the joint formed by the pipe sections. Each of these advantageous attributes are achieved by the saddle formed in accordance with this invention, while also having the benefit of being formed by the relatively uncomplicated processing methods described above, so as to minimize the manufacturing costs of the saddle. Accordingly, the method of this invention advantageously achieves a desirable balance of strength, adaptiveness and cost.

Accordingly, it is an object of the present invention to provide a method for forming a saddle for a U-bolt clamp used to interconnect the components of an automotive exhaust system.

It is a further object of the invention that the method involve the forming of the saddle from a single member.

It is still a further object of the invention that the method be capable of producing a saddle which exhibits sufficient structural rigidity for generating a clamping load which can reliably secure together the components of the automotive exhaust system.

It is another object of the invention that the saddle exhibit sufficient resilience in order to be able to accommodate variations in pipe size and hardness, so as to be able to reliably seal the joint formed by the components.

It is yet another object of the invention that the method be relatively uncomplicated and involve a series of conventional forming operations which offer a relatively low cost manufacturing process suitable for use in mass production.

It is still another object of the invention that the method eliminate the requirement for a welding operation to secure portions of the saddle together.

Other objects and advantages of this invention will be more apparent after a reading of the following detailed description taken in conjunction with the drawings provided.

BRIEF DESCRIPTION OF THE DRAWINGS

FIG. 9 is a plan view illustrating a series of forming operations by which a saddle for a U-bolt clamp can be formed in accordance with a second embodiment of this invention;

FIGS. 10A and 10B are edge and end views along lines 10A and 10B of FIG. 9, respectively, illustrating the series of forming operations shown in FIG. 9;

FIG. 11 is a frontal view of the saddle formed in accordance with the forming operations of FIGS. 9, 10A and 10B;

DETAILED DESCRIPTION OF THE PREFERRED EMBODIMENT

Figure 1:
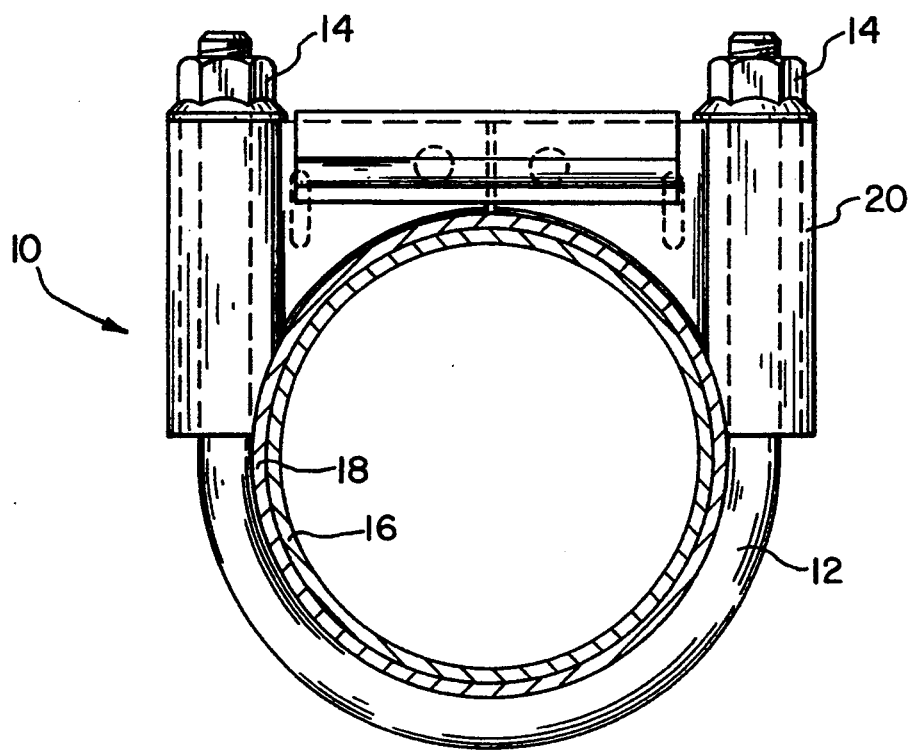
FIG. 1 is a frontal view of a U-bolt clamp for interconnecting the components of an automotive exhaust system, wherein the saddle of the U-bolt clamp has been formed in accordance with a preferred embodiment of this invention.

With reference to FIG. 1, there is shown a U-bolt clamp assembly 10 composed of a U-bolt 12 and a saddle 20. The U-bolt 12 is retained on the saddle 20 with a pair of nuts 14 which are threaded onto the threaded ends of the U-bolt 12. As shown, the U-bolt clamp assembly 10 is received on a pair of pipe sections of the type typically used in an automotive exhaust system. A first or inner pipe section 16 is nested or telescoped within a second or outer pipe section 18 to form a leak proof joint which prevents exhaust gases from escaping between the pipe sections 16 and 18. In order for the U-bolt clamp assembly 10 to generate a clamping load which is sufficient to collapse the outer pipe section 18 around the inner pipe section 16, both the U-bolt 12 and the saddle 20 must be structurally rigid and strong. However, to assure that the clamping load is sufficiently distributed so as to uniformly collapse the outer pipe section 18 and thereby promote a leak proof joint, a degree of resiliency is also required of the U-bolt clamp assembly 10. In accordance with this invention, the saddle 20 of the U-bolt clamp assembly 10 is specifically formed in order to exhibit both the structural rigidity and resilience necessary to produce a reliable interconnection between the inner and outer pipe sections 16 and 18.

Figure 2:
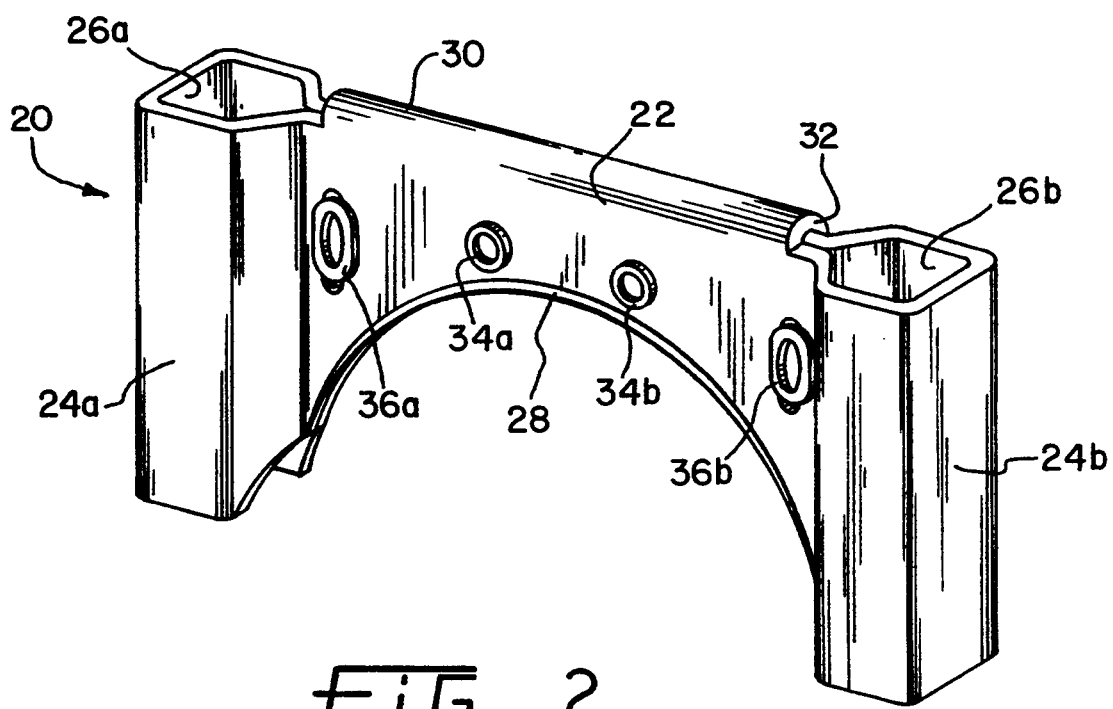
FIG. 2 is a perspective view of the saddle of FIG. 1 in accordance with the preferred embodiment of this invention.

FIG. 2 shows in greater detail the saddle 20 in accordance with a preferred embodiment of this invention. Generally, the saddle 20 includes a web 22 which interconnects a pair of channel members 24a and 24b. Each channel member 24a and 24b defines a corresponding channel 26a and 26b, respectively, through which is received a leg of the U-bolt 12, as shown in FIG. 1. As depicted, the channels 26a and 26b generally have pentagonal cross sections, though it is foreseeable that the cross sections of the channels 26a and 26b could differ from that shown in FIG. 2 and yet be suitably formed in accordance with one or both of the methods of this invention.

Figure 5:
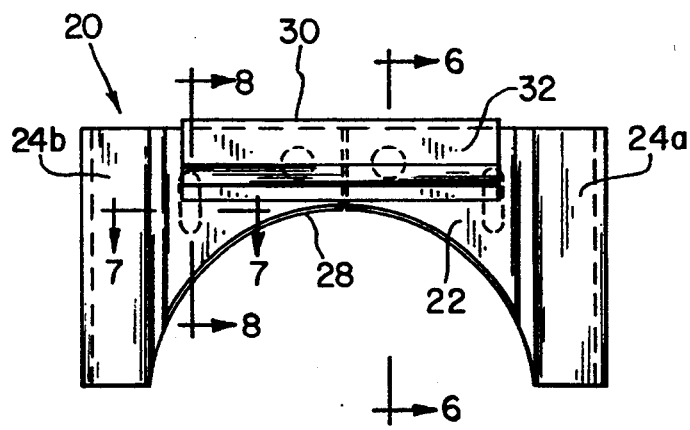
FIG. 5 is a frontal view of the saddle of FIG. 1.

The web 22 is generally composed of two layers of sheet metal, with a second of the two layers being clinched to the first layer with four clinches, identified as inner clinches 34a and 34b and outer clinches 36a and 36b. The web 22 has an inner edge 28 which has approximately a semicircular contour that is sized to correspond to the curvature of the outer pipe section 18 and which, in cooperation with the U-bolt 12, is able to receive and generate a clamping load on the outer pipe section 18. Preferably, the sides of the inner edge 28 are chamfered in order to increase the contact pressure of the web 22 on the inner and outer pipe sections 16 and 18. An outer edge 30 of the web 22 is disposed opposite the inner edge 28. The outer edge 30 is defined by a tab 32 which projects from the web's first layer of sheet metal and overlays the web's second layer of sheet metal, as can be more readily seen in FIG. 5.

The above structure of the saddle 20 is similar to the saddle taught by Goforth. However, an important difference between the Goforth saddle and that of this invention is that Goforth teaches a two-piece saddle construction, while the saddle 20 of this invention is formed from a single sheet of metal. Accordingly, the method by which the saddle 20 of this invention is formed is completely different from the method taught by Goforth. In particular, the method of this invention serves to simplify the processing steps by which the saddle 20 is manufactured, yet retains the primary structural advantages taught by Goforth.

Figure 3:
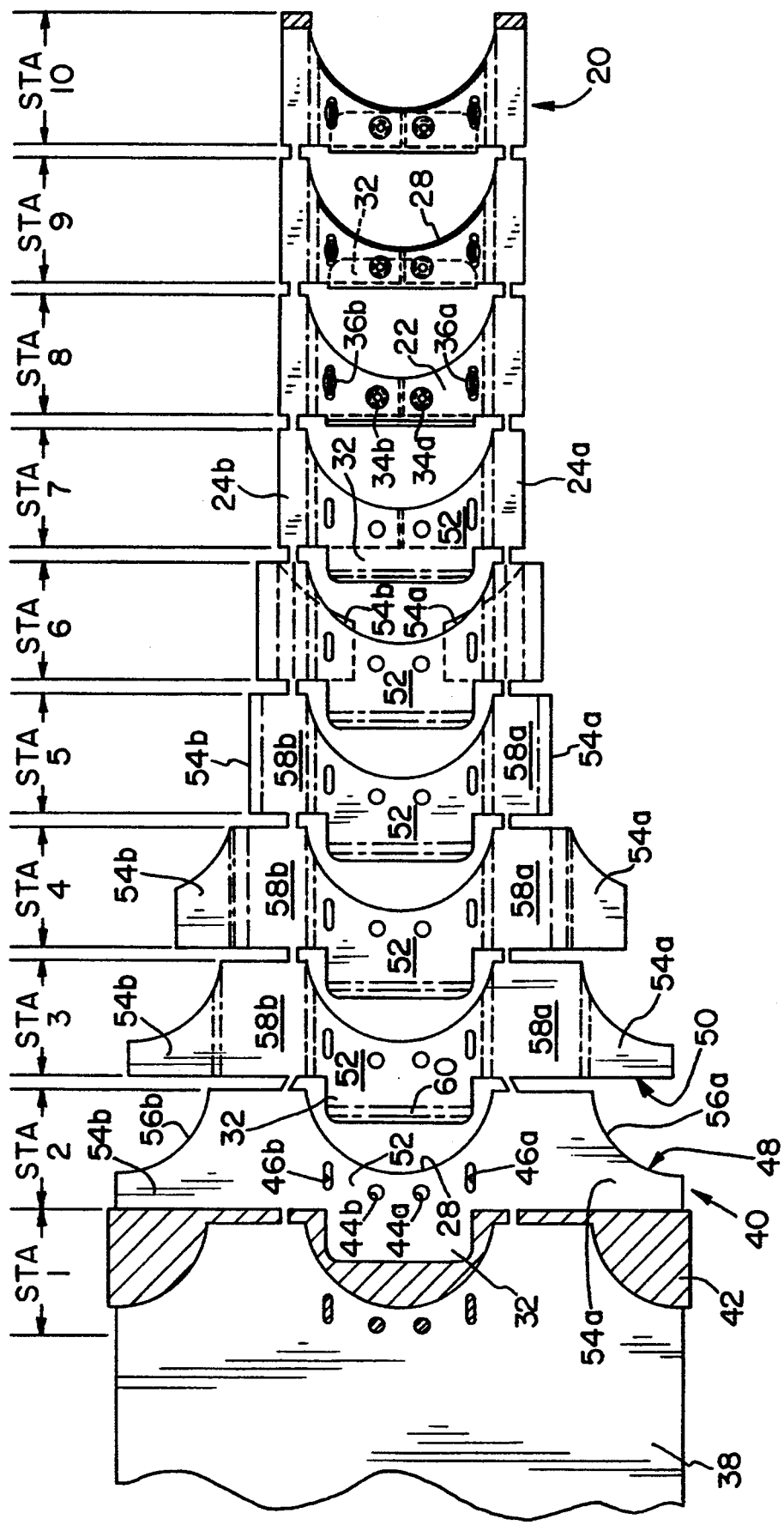
FIG. 3 is a plan view illustrating a preferred series of forming operations by which the saddle of FIG. 2 is formed.
Figure 4:
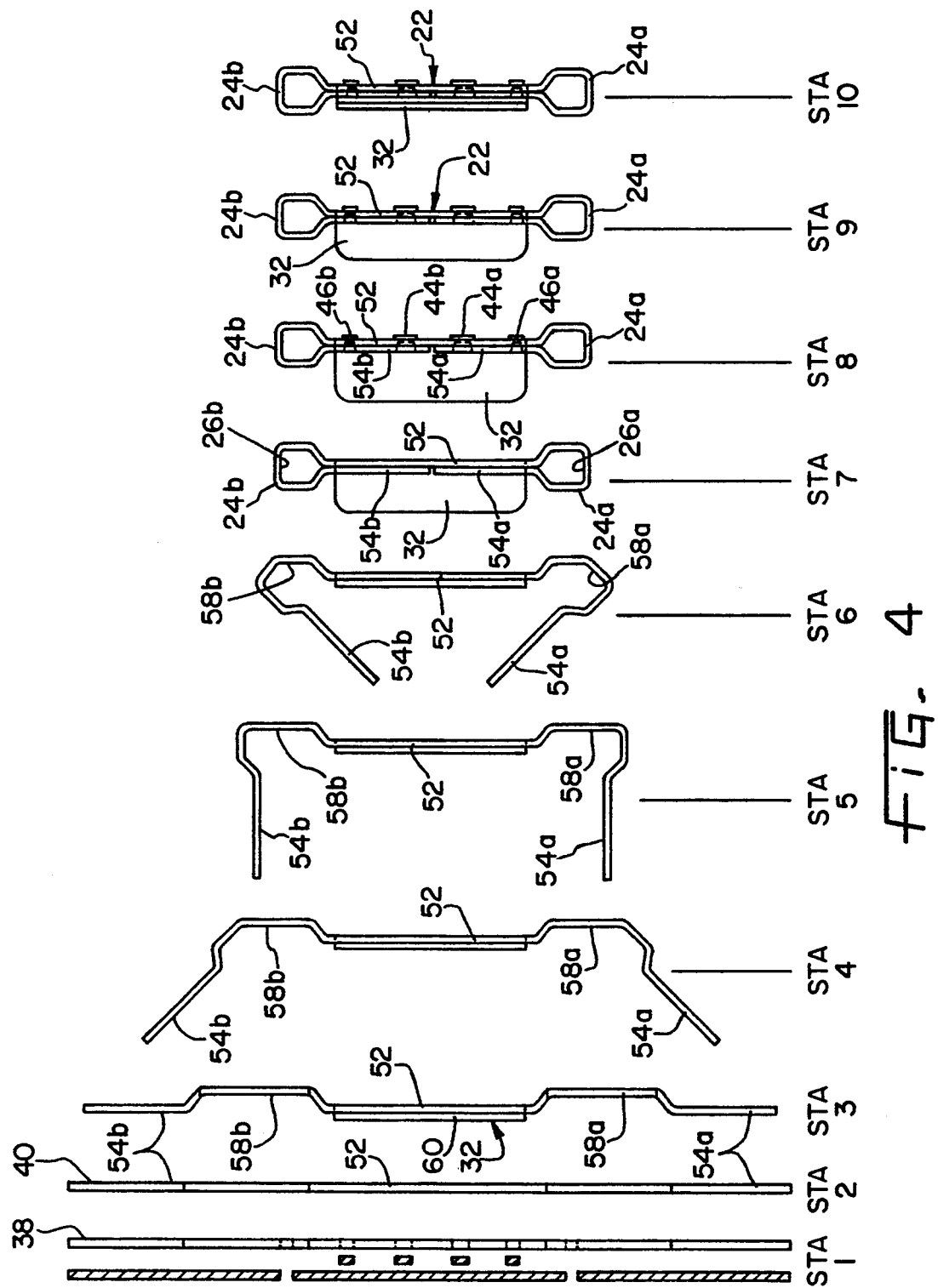
FIG. 4 is an edge view illustrating the preferred series of forming operations shown in FIG. 3.

A preferred embodiment for the manufacture of the saddle 20 of this invention is illustrated in FIGS. 3 and 4. FIG. 3 represents a plan view of the preferred process, represented as Stages 1 through 10, while FIG. 4 illustrates the identical stages of the preferred process as viewed from the inner edge 28 of the web 22. Stage 1 is generally a stamping operation in which a sheet of metal 38 is pierced and notched with a suitable punch 42 in cooperation with a die (not shown) to form a planar blank 40. Holes, identified as inner holes 44a and 44b and outer holes 46a and 46b, are pierced in the sheet metal 38, and the leading profile 48 of the sheet metal 38 at Stage 1 is defined while the trailing profile 50 of the preceding blank 40 at Stage 2 is being defined. The inner holes 44a and 44b correspond to the inner clinches 34a and 34b, respectively, shown in FIG. 2, while the outer holes 46a and 46b correspond to the outer clinches 36a and 36b, respectively, shown in FIG. 2. Stage 1 of FIG. 4 shows, as cross hatched, the removed portions of the sheet metal 38.

Stage 2 is an idle and pilot station prior to proceeding with a series of forming operations conducted during Stages 3 through 10. At this point, the blank 40 has been formed to have an intermediate portion 52 and two oppositely disposed end portions 54a and 54b. The intermediate portion 52 will eventually define one thickness of the web 22, while the end portions 54a and 54b will combine to define the second thickness of the web 22. The tab 32 projects from the trailing profile 50 of the intermediate portion 52, while the inner edge 28 of the web 22 is defined at the leading profile 48 of the intermediate portion 52. The end portions 54a and 54b have arcuate contours 56a and 56b defined at their respective distal edges along the leading profile 48 of the blank 40. Each arcuate contour 56a and 56b approximately corresponds to one half of the semicircular shape of the inner edge 28 defined by the intermediate portion 52, and therefore approximately corresponds to one fourth of the outer perimeter of the outer pipe section 18.

Stage 3 represents the first forming operation, during which precursors 58a and 58b of the channels 26a and 26b, respectively, are formed between the intermediate portion 52 and each of the end portions 54a and 54b, as more readily seen in FIG. 4. In addition, a rib 60 is preferably formed in the tab 32 in order to contribute added rigidity. Stages 4 through 7 represent the subsequent forming operations during which the end portions 54a and 54b are bent toward each other until they overlay the intermediate portion 52, as can be readily seen in FIG. 4. At Stage 7, the channel precursors 58a and 58b now define the channels members 24a and 24b, respectively. During Stage 7, the tab 32 is bent to be substantially at a 45 degree angle to the plane of the blank 40.

Figure 7:
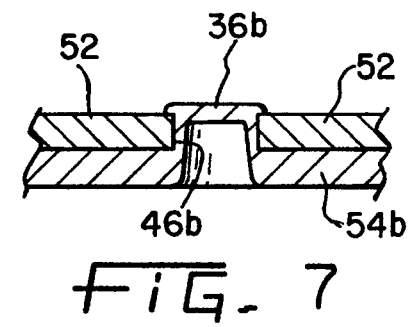
FIG. 7 is a cross-sectional view of the saddle along line 7—7 of FIG. 5.
Figure 6:
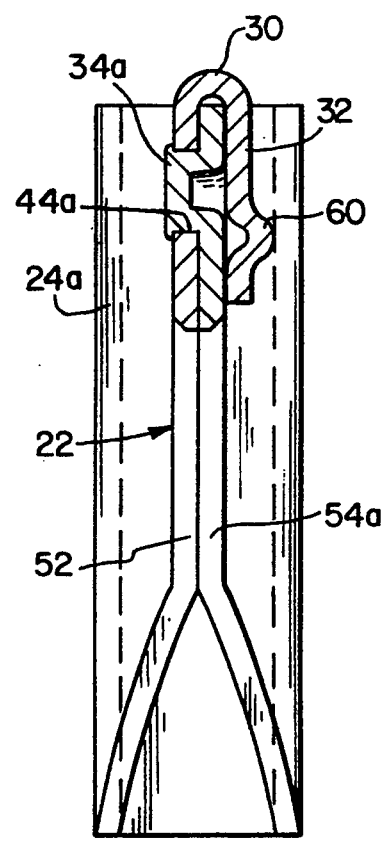
FIG. 6 is a cross-sectional view of the saddle along line 6—6 of FIG. 5.
Figure 8:
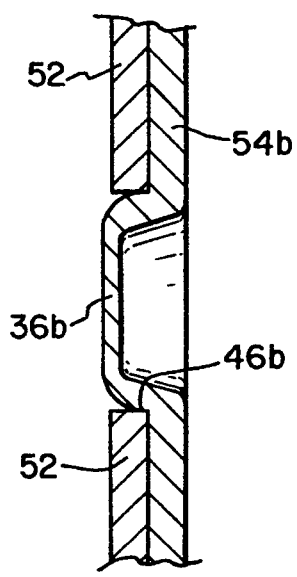
FIG. 8 is a cross-sectional view of the saddle along line 8—8 of FIG. 5.

Stage 8 illustrates the crimping operation that forms the web 22, in which metal from the end portions 54a and 54b has been drawn through the inner holes 44a and 44b and the outer holes 46a and 46b so as to form the inner clinches 34a and 34b and the outer clinches 36a and 36b, respectively. The preferred configuration for the inner clinches 34a and 34b is shown in FIG. 6, while the preferred configuration for the outer clinches 36a and 36b is shown in FIGS. 7 and 8. In addition, the tab 32 is further bent during Stage 8 to be substantially perpendicular to the plane of the blank 40.

Stage 9 represents a coining operation, during which chamfers are formed on the inner edge 28 of the web 22, which includes the leading edge 48 of the intermediate portion 52 and the arcuate contours 56a and 56b of the end portions 54a and 54b. During Stage 9, the tab 32 is further bent until it is substantially at a 45 degree angle to the plane of the blank 40. Finally, Stage 10 shows the results of a restrike, which produces the saddle 20 in its final form. During the restrike, the tab 32 is bent so as to be abutted face-to-face against and substantially parallel to the exposed surface of the intermediate portion 52. In addition, the final cut off operation is performed in order to sever the saddle 20 from the preceding saddle 20.

From the above, it can be appreciated that the preferred manufacturing method of this invention is advantageous, in that a series of operations can be performed in relatively continuous stages to form the saddle 20. As a result, the saddle 20 can be produced at a single station having sequential dies for the series of stages shown in FIGS. 3 and 4. Such a capability provides a relatively uncomplicated and low cost manufacturing process.

Figure 12:
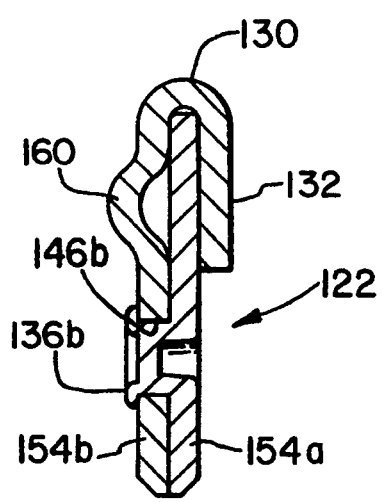
FIG. 12 is a cross-sectional view of the saddle along line 12—12 of FIG. 11.
Figure 13:
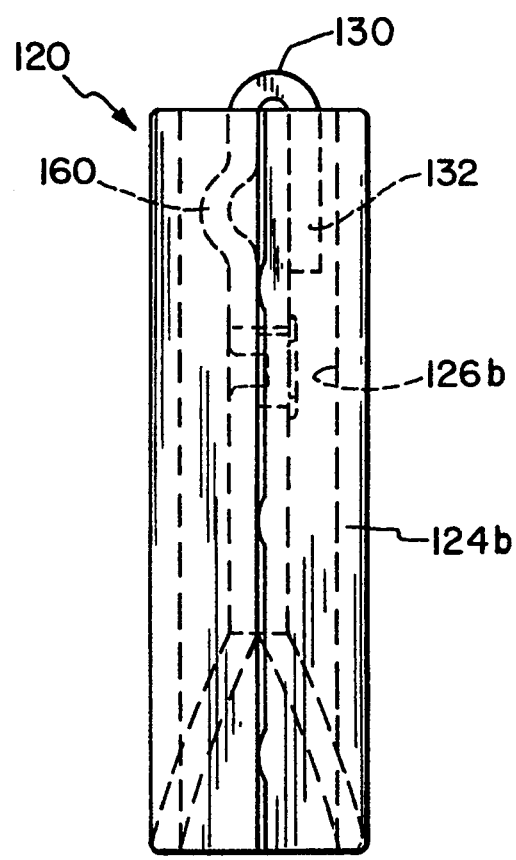
FIG. 13 is an end view of the saddle of FIG. 11.

A method for the manufacture of a saddle 120 in accordance with a second embodiment of this invention is illustrated in FIGS. 9, 10A and 10B. Essentially all of the structural and processing advantages associated with the saddle 20 of the first embodiment are retained, through with modified processing steps. FIGS. 11 and 13 show the saddle 120 formed in accordance with the second method of this invention. Generally, the saddle 120 includes a web 122 which interconnects a pair of channel members 124a and 124b. Each channel member 124a and 124b defines a corresponding channel 126a and 126b, respectively, through which is received a leg of the U-bolt 12. The web 122 is generally composed of two layers of sheet metal, with a second of the two layers being clinched to the first layer with clinches 136a and 136b. The web 122 has an inner edge 128 which is preferably chamfered and has approximately a semicircular contour sized to correspond to the curvature of the outer pipe section 18. An outer edge 130 of the web 122 is disposed opposite the inner edge 128, and is defined by a tab 132 which projects from one sheet metal layer of the web 122 and overlays the web's second layer of sheet metal, as noted with the saddle 20 of the first embodiment. In contrast to the first embodiment, in which a rib 60 is formed on the tab 32, the saddle 120 of the second embodiment has a rib 160 formed on the surface of the web 122 opposite the tab 132, as seen in FIGS. 12 and 13.

FIG. 9 represents a plan view of the process for forming the saddle 120, shown as Stages 1 through 8. FIG. 10A illustrates Stages 1 through 4 of the process as viewed from the edge of the end portions 154a, while FIG. 10B illustrates Stages 5 through 7 of the process as viewed from one end of the saddle 120, as indicated in FIG. 9. Stage 1 is generally a stamping operation in which a metal sheet 138 is pierced and notched with a suitable punch 142 in cooperation with a die (not shown) to form a planar blank 140. Stage 1 of FIG. 10A shows, as cross hatched, the removed portions of the metal sheet 138. Stage 1 serves as an idle and pilot station prior to proceeding with a series of forming operations conducted during Stages 2 through 8. At this point, the blank 140 has been formed to have an intermediate portion 152 and the two oppositely disposed end portions 154a and 154b. The intermediate portion 152 will eventually define the outer edge 130 of the web 122, while the end portions 154a and 154b will combine to define the web 122 and its inner edge 128. The tab 132 will also be formed from an interior portion of the intermediate portion 152. Stage 1 illustrates an elongate cutout 134 which will serve to define the tab 132 during Stage 3.

Stage 2 represents the first forming operation, during which precursor halves 158a and 158b of the channels members 124a and 124b, respectively, are formed at the leading edge 148 and trailing edge 150 of each of the end portions 154a and 154b, as more readily seen in FIG. 10A. In addition, the rib 160 is preferably formed in the end portion 154b adjacent the intermediate portion 152 in order to contribute added rigidity to the web 122. Stage 3 illustrates an additional piercing operation which is utilized to form semicircular cutouts that define the inner edges 128 of the web 122, and a pair of holes 146a and 146b which will be used to form the clinches 136a and 136b. In addition, the tab 132 becomes cantilevered from the intermediate portion 152 during Stage 3, as best seen in FIG. 9. As shown, the tab 132 is bent to be substantially at a 45 degree angle to the plane of the blank 140.

Stages 4 through 6 represent the subsequent forming operations during which the end portions 154a and 154b are bent toward each other until they mate to form the web 122 and the channels 126a and 126b, as can be readily seen in FIG. 9. At Stage 4, the channel precursors 158a and 158b are each shaped to define half of the channels 126a and 126b, respectively. In addition, Stage 4 represents a coining operation, during which chamfers are formed on the inner edges 128 of the end portions 154a and 154b. Stage 6 illustrates the crimping operation, in which metal from one end portion 154a has been drawn through the holes 146a and 146b in the other end portion 154b so as to form the clinches 136a and 136b, respectively. The preferred configuration for the clinches 136a and 136b is shown in FIG. 12. The tab 132 is now substantially perpendicular to the plane of the web 122.

During Stage 7, the tab 132 is further bent until it is abutted against and substantially parallel to the web 122. Finally, Stage 8 of FIG. 9 shows the results of a final cut off operation in which the saddle 120 is severed from the preceding saddle 120. As with the preferred embodiment, it can be appreciated that the second manufacturing method of this invention is advantageous, in that a series of operations can be performed in relatively continuous stages to form the saddle 120.

Accordingly, a significant advantage of the manufacturing methods of the present invention is that a saddle for a U-bolt clamp assembly can be produced at a single station having sequential dies, enabling a relatively uncomplicated and low cost manufacturing process. Each of the methods of this invention begins with a blanking operation from which a single blank is formed, such that the requirement to separately form, mate and join two complementary members is eliminated. Subsequent forming operations generate the saddle's channels and wrap the tab around the outer edge of the saddle in order to provide reinforcement to the saddle without contributing excessive rigidity. Instead of a welding operation relied on by the prior art, each method of this invention relies on a clinching operation by which portions of the blank are permanently and reliably joined to form the web. Consequently, additional manufacturing equipment is not required on the assembly line, other than the tooling necessary to perform the blanking, forming and clinching operations.

Another significant advantage of the present invention is that the saddles formed by the processing methods of this invention exhibit sufficient structural strength so as to be capable of generating a clamping load which can reliably join pipe sections of an automotive exhaust system. Yet, the saddles also exhibit sufficient resiliency in order to be able to accommodate variations in pipe size and hardness, so as to be able to reliably seal the joint formed by the pipe sections. Each of these attributes are achieved by the saddles formed in accordance with this invention, while also having the benefit of being formed by the relatively uncomplicated processing methods described above. Accordingly, the methods of this invention advantageously produce saddles which embody a desirable balance between strength and adaptiveness, while also minimizing manufacturing costs.

While the invention has been described in terms of a preferred embodiment, it is apparent that other forms could be adopted by one skilled in the art. For example, the precise shape and contours of the individual sections of the saddle could be other than that shown in the Figures. Additionally, other means for joining the web's two layers of sheet metal could be adopted by those skilled in the art to achieve roughly the same structural characteristics described. Accordingly, the scope of the invention is to be limited only by the following claims.

What is claimed is:

1. A method for forming a U-bolt clamp saddle for a U-bolt clamp assembly, said method comprising the steps of:

forming a substantially planar body having a first end portion, an oppositely disposed second end portion, and an intermediate portion between said first end portion and said second end portion, said first end portion terminating in a first distal edge and said second end portion terminating in a second distal edge, said intermediate portion defining first and second lateral edges of said planar body, said intermediate portion having a tab member formed therewith;

bending said first end portion and said second end portion towards each other such that said first distal edge is proximate said second distal edge and such that an oppositely disposed pair of channels and a web intermediate said pair of channels are formed; and bending said tab member such that said tab member overlays at least a portion of at least one of said first and second end portions.

2. The method of claim 1 wherein said forming step includes forming said planar body such that each of said first and second distal edges of said first and second end portions have semicircular contours and such that said tab member is defined by an interior portion of said intermediate portion.

3. The method of claim 2 further comprising the step of forming an oppositely disposed pair of channel precursors on each of said first end portion and said second end portion, wherein said pair of channel precursors forms said pair of channels during said step of bending said first end portion and said second end portion.

4. The method of claim 2 further comprising the step of securing said first and second end portions together.

5. The method of claim 1 wherein said forming step includes forming said planar body such that said first lateral edge has a semicircular contour and such that said tab member projects from said second lateral edge.

6. The method of claim 5 wherein said step of bending said first end portion and said second end portion forms said pair of channels in regions of said planar body intermediate said first end portion and said intermediate portion and intermediate said second end portion and said intermediate portion, respectively.

7. The method of claim 5 further comprising the step of securing each of said first and second end portions to said intermediate portion so as to secure said first distal edge proximate said second distal edge.

8. The method of claim 5 wherein said step of bending said tab member includes securing said first and second end portions between said tab member and said intermediate portion.

9. The method of claim 5 wherein said forming step comprises forming a first arcuate contour on said first end portion and a second arcuate contour on said second end portion, such that said first and second arcuate contours cooperate to define a second substantially semicircular contour when said first distal edge is proximate said second distal edge.

10. A method for forming a U-bolt clamp saddle for a U-bolt clamp assembly, wherein said U-bolt clamp saddle includes a web intermediate a pair of channels, said method comprising the steps of:

forming a substantially planar body such that said planar body comprises:
 a first end portion having a first arcuate contour and terminating in a first distal edge;
 a second end portion oppositely disposed from said first end portion, said second end portion having a second arcuate contour and terminating with a second distal edge;
 an intermediate portion between said first end portion and said second end portion, said intermediate portion defining first and second lateral edges of said planar body;
 a substantially semicircular contour formed at said first lateral edge of said intermediate portion; and
 a tab projecting from said second lateral edge of said intermediate portion;

bending said first end portion and said second end portion toward said intermediate portion so as to form said pair of channels, such that said first and second end portions overlay said intermediate portion so as to form said web, and such that said first distal edge is proximate said second distal edge, said first and second arcuate contours cooperating to form a second substantially semicircular contour which is complementary to and aligned with said semicircular contour of said intermediate portion; and bending said tab such that said tab at least partially overlays said first and second end portions.

11. The method of claim 10 wherein said step of bending said first end portion and said second end portion forms said pair of channels in regions of said planar body intermediate said first end portion and said intermediate portion and intermediate said second end portion and said intermediate portion, respectively.

12. The method of claim 10 further comprising the step of securing each of said first and second end portions to said intermediate portion so as to secure said first distal edge proximate said second distal edge.

13. The method of claim 10 further comprising the step of forming a first pair of apertures in a central region of said intermediate portion and a second pair of apertures in said intermediate portion adjacent said first and second end portions.

14. The method of claim 13 further comprising the steps of:

plastically deforming a portion of said first end portion through a first of said first pair of apertures and an adjacent aperture of said second pair of apertures; and plastically deforming a portion of said second end portion through a second of said first pair of apertures and an adjacent aperture of said second pair of apertures;

whereby said first and second end portions are secured to said intermediate portion.

15. The method of claim 13 wherein said step of bending said first end portion and said second end portion includes forming said pair of channels to have substantially pentagonal cross sections.

16. The method of claim 10 further comprising the step of forming a reinforcing rib in said tab.

17. The method of claim 10 wherein said step of bending said first end portion and said second end portion includes abutting said first and second end portions face-to-face against said intermediate portion so as to form said web.

18. A method for forming a U-bolt clamp saddle for a U-bolt clamp assembly, wherein said U-bolt clamp saddle includes a web intermediate a pair of channels, said method comprising the steps of:

forming a substantially planar body such that said planar body comprises:
 a first end portion having a first arcuate contour and terminating in a first distal edge;
 a second end portion oppositely disposed from said first end portion, said second end portion having a second arcuate contour and terminating with a second distal edge;
 an intermediate portion between said first end portion and said second end portion, said intermediate portion defining first and second lateral edges of said planar body;
 a substantially semicircular contour formed at said first lateral edge of said intermediate portion;
 a tab projecting from said second lateral edge of said intermediate portion;
 at least one pair of apertures formed in said intermediate portion;

bending said first end portion and said second end portion toward said intermediate portion such that said first and second end portions overlay said intermediate portion and such that said first end portion and said second end portion form a pair of oppositely disposed channels in regions of said planar body intermediate said first end portion and said intermediate portion and intermediate said second end portion and said intermediate portion, respectively, said first and second arcuate contours cooperating to form a second substantially semicircular contour which is complementary to and aligned with said semicircular contour;

plastically deforming a portion of said first end portion through a first of said at least one pair of apertures so as to secure said first end portion to said intermediate portion;

plastically deforming a portion of said second end portion through a second of said at least one pair of apertures so as to secure said second end portion to said intermediate portion; and bending said tab such that said tab at least partially overlays said first and second end portions.

19. The method of claim 18 further comprising the step of forming a reinforcing rib in said tab.

20. The method of claim 18 wherein said step of bending said first end portion and said second end portion includes abutting said first and second end portions face-to-face against said intermediate portion so as to form said web.

* * * * *